F. W. JOHNSTONE.
SPRING FOR MOTOR ROAD VEHICLES.
APPLICATION FILED JUNE 29, 1921.

1,414,813.

Patented May 2, 1922.
2 SHEETS—SHEET 1.

INVENTOR
Fredrick William Johnstone

By [signature]

his ATTORNEY.

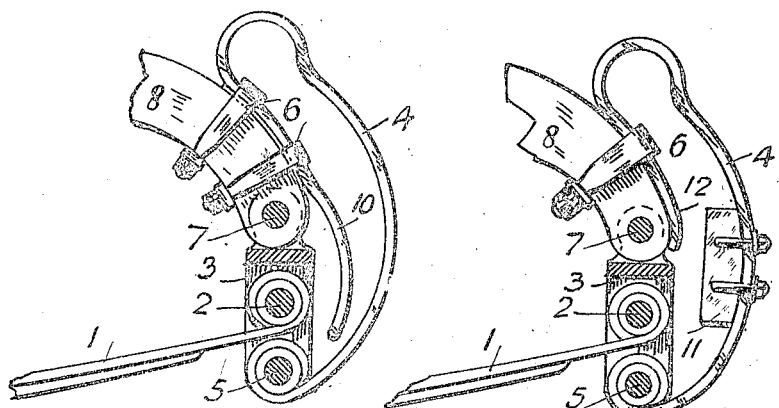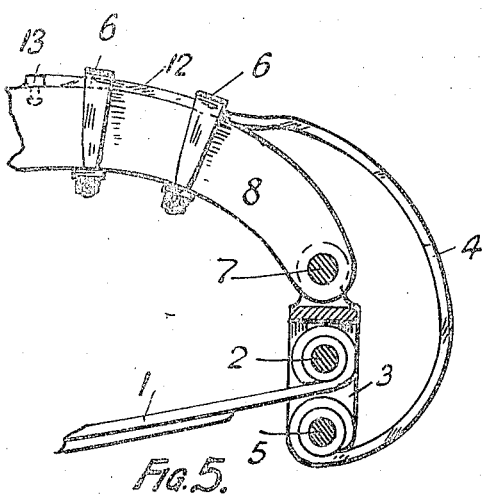

UNITED STATES PATENT OFFICE.

FREDRICK WILLIAM JOHNSTONE, OF MURRUMBURRAH, NEW SOUTH WALES, AUSTRALIA.

SPRING FOR MOTOR ROAD VEHICLES.

1,414,813.  Specification of Letters Patent.  Patented May 2, 1922.

Application filed June 29, 1921. Serial No. 481,175.

*To all whom it may concern:*

Be it known that I, FREDRICK WILLIAM JOHNSTONE, a subject of the King of Great Britain and Ireland, residing at Clarke Street, Murrumburrah, New South Wales, Australia, have invented certain new and useful Improvements in Springs for Motor Road Vehicles, of which the following is a specification.

This invention relates to bearing springs for motor road vehicles. It refers to the side suspension springs for the forward part of such vehicles.

The said bearing springs comprise semi-elliptic laminated metal leaf springs the ends of which are carried by shackles which are pivoted to the chassis of the vehicle. Associated with the shackle at the front of the vehicle is a bent leaf spring, one end of which is secured to the chassis and the other end is connected to the shackle; such bent leaf spring is adapted to act as a buffer spring to the semi-elliptic leaf spring attached to the shackle and also as a bumper guard to the vehicle. A resilient buffer pad may be provided on the bent leaf spring or the loose end of said spring may be formed to act as a buffer thereto.

Figure 1:
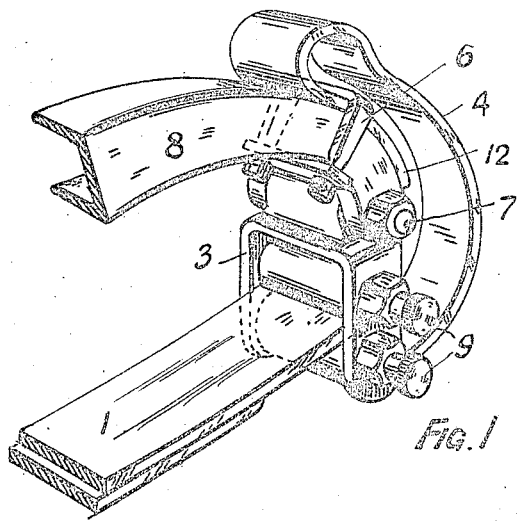
Figure 2:
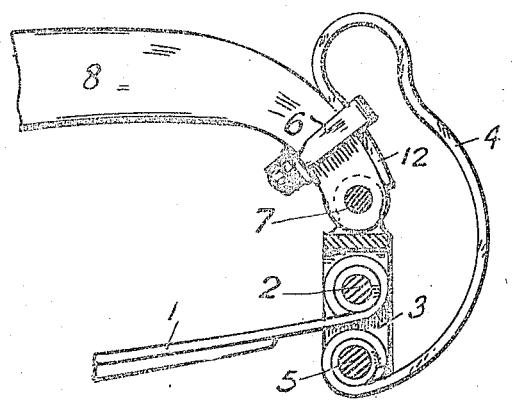

Referring to the accompanying drawings, Fig. 1 is a broken perspective view of a side bearing spring for a motor road vehicle; Fig. 2 is a section thereof; and Figs. 3 to 5 are sectional views of alternative constructions of bearing springs to the springs shown in Figs. 1 and 2.

In the construction of springs shown in Figs. 1 and 2, the side springs for the forward part of the vehicle consist of semi-elliptic laminated metal leaf springs 1. One end of these springs is carried by a bolt 2 secured to the shackle 3 which is pivotally connected by means of a bolt 7 to a dumbiron, or hanger, or bracket affixed to the front of the chassis 8 of the vehicle. The other end of the spring 1 is connected to a shackle fastened in the usual manner to the chassis 8.

The shackle 3 has associated with it a metal leaf spring 4 bent to adapt it not only to act as a buffer to the shackle 3 and the semi-elliptic spring 1 but also as a bumper device to absorb shocks in the event of the front of the vehicle meeting an obstruction. At its lower end the spring 4 is connected to a bolt 5 attached to the shackle 3 whilst toward its other end it is secured to the chassis 8 of the vehicle by any suitable clamping device 6. The spring 4 is bent outwardly from the front of the chassis. As its lower end is connected to the shackle 3 it takes part of the stress imposed on such shackle by the semi-elliptic spring 1 which is free to expand longitudinally consequent to its being compressed through the action of the vehicle wheels, owing to road inequalities. Oil feeding devices 9 of approved type are provided in connection with the bolts 2 and 5.

With reference to Figs. 3 to 5, the bearing springs shown therein are of similar construction to those shown in Figs. 1 and 2. In Figs. 3 and 4 resilient buffering devices are provided in connection with the spring 4. Such device may be formed integral with the said spring or it may be independent thereof and secured thereto. When the buffering device is to be integral with the spring 4 the loose end 10 of the spring is bent to lie rearwardly of the front of the spring. If the buffering device is to be formed independent of the spring 4 it may consist of a block 11 of rubber or other resilient means removably secured to the front of the spring. The said buffering device prevents the bent front portion of the spring 4 coming into contact with the front of the chassis 8 or the shackle 3 when the stress imposed on the spring 4 through the expansion of the spring 1 is relaxed.

Instead of bending the end 12 of the spring 4 to permit it to overlie the forward portion of the chassis 8 it may be secured to the chassis as shown in Fig. 5. In such figure the end 12 of the spring 4 is shown carried along the chassis 8 and is preferably arranged to contact with the abutment 13.

What I claim as my invention and desire to secure by Letters Patent is:—

1. In bearing springs for motor road vehicles, a semi-elliptic laminated metal leaf spring carried at its ends by shackles pivotally secured to the vehicle frame and a bent metal leaf spring associated with one of said shackles adapted when secured at one portion to the front of the vehicle frame and at another portion to said latter shackle to act as a bumper guard to absorb shocks at the forward portion of the vehicle and also as a buffer to said semi-elliptic leaf spring.

2. Bearing springs for motor road vehicles comprising semi-elliptic laminated metal leaf springs arranged longitudinally of the forward portion of the vehicle frame, shackles pivotally secured to said frame carrying the forward and rearward ends of said semi-elliptic leaf springs, and a bent metal leaf spring associated with each of the shackles carrying the forward ends of said semi-elliptic leaf springs, said bent leaf spring being secured at one portion to the front of said vehicle frame and at another portion to said latter shackles and adapted to act as a buffer to said semi-elliptic leaf springs and as a bumper guard to absorb shocks at the forward part of the vehicle.

3. In bearing springs for motor road vehicles as set forth in claim 1, the combination with said bent metal leaf spring of resilient buffering means adapted to prevent said spring contacting with the front portion of the frame of the vehicle or with a shackle carried pivotally thereon to which the forward end of the semi-elliptic leaf spring is attached when stress imparted to said bent metal leaf spring through said semi-elliptic leaf spring is relaxed.

In testimony whereof I have affixed my signature.

FREDRICK WILLIAM JOHNSTONE.